United States Patent
Wang

(10) Patent No.: US 11,978,418 B2
(45) Date of Patent: May 7, 2024

(54) CONTROL METHOD AND CONTROL DEVICE OF DRIVE CIRCUIT AND DRIVE CIRCUIT

(71) Applicants: Beihai HKC Optoelectronics Technology Co., Ltd., Beihai (CN); CHONGQING HKC OPTOELECTRONICS TECHNOLOGY CO., LTD., Chongqing (CN)

(72) Inventor: Mingliang Wang, Chongqing (CN)

(73) Assignees: BEIHAI HKC OPTOELECTRONICS TECHNOLOGY CO., LTD., Beihai (IN); CHONGQING HKC OPTOELECTRONICS TECHNOLOGY CO., LTD, Chongqing (CN)

( * ) Notice: Subject to any disclaimer, the term of this patent is extended or adjusted under 35 U.S.C. 154(b) by 113 days.

(21) Appl. No.: 17/422,360

(22) PCT Filed: Jun. 10, 2020

(86) PCT No.: PCT/CN2020/095419
§ 371 (c)(1),
(2) Date: Jul. 12, 2021

(87) PCT Pub. No.: WO2020/249019
PCT Pub. Date: Dec. 17, 2020

(65) Prior Publication Data
US 2022/0093052 A1    Mar. 24, 2022

(30) Foreign Application Priority Data

Jun. 10, 2019 (CN) .......................... 201910496778.9

(51) Int. Cl.
*G09G 3/36* (2006.01)
*G06F 13/40* (2006.01)
*G06F 13/42* (2006.01)

(52) U.S. Cl.
CPC ....... *G09G 3/3648* (2013.01); *G06F 13/4018* (2013.01); *G06F 13/4282* (2013.01); *G09G 2310/08* (2013.01)

(58) Field of Classification Search
CPC . G06F 13/4018; G06F 13/4282; G09G 1/005; G09G 2310/08; G09G 2320/0666;
(Continued)

(56) References Cited

U.S. PATENT DOCUMENTS

| 5,892,933 A | 4/1999 | Voltz |
| 2002/0036636 A1* | 3/2002 | Yanagi ................ H02M 3/073 345/92 |

(Continued)

FOREIGN PATENT DOCUMENTS

| CN | 103472748 A | 12/2013 |
| CN | 105096860 A | 11/2015 |

(Continued)

OTHER PUBLICATIONS

International Search Report for corresponding International Application No. PCT/CN2020/095419 dated Sep. 15, 2020, 6 pages.

(Continued)

*Primary Examiner* — Hong Zhou
(74) *Attorney, Agent, or Firm* — Franklin & Associates International Inc; Matthew F. Lambrinos

(57) ABSTRACT

The present application refers to a control method and control device of a drive circuit, and a drive circuit. The control method of the drive circuit includes: acquiring a bus address in a bus signal. The bus signal is a signal transmitted over an I2C bus, and the I2C bus is connected to a timing (Continued)

controller. The control method further includes: if the timing controller determining that the bus address matches an address of the timing controller, transmitting a frequency adjustment signal to a controllable power supply with an adjustable operating frequency and connected to the timing controller. The frequency adjustment signal is configured to indicate that an operating frequency of the controllable power supply is adjusted from a first operating frequency to a second operating frequency. The second operating frequency is higher than the first operating frequency.

19 Claims, 8 Drawing Sheets

(58) Field of Classification Search
CPC .... G09G 2330/00; G09G 3/36; G09G 3/3611; G09G 3/3648; Y02D 10/00
See application file for complete search history.

(56) References Cited

U.S. PATENT DOCUMENTS

| | | | |
|---|---|---|---|
| 2009/0150602 A1* | 6/2009 | Sauber | G06F 1/3275 |
| | | | 711/E12.083 |
| 2009/0292840 A1* | 11/2009 | Konnail | G06F 1/3287 |
| | | | 710/61 |
| 2013/0262831 A1* | 10/2013 | Nelson | G06F 9/3887 |
| | | | 712/215 |
| 2015/0048743 A1* | 2/2015 | Liao | G09G 3/3225 |
| 2016/0232833 A1* | 8/2016 | Wang | G06F 13/4022 |
| 2018/0046595 A1* | 2/2018 | Pitigoi-Aron | G06F 13/4022 |
| 2018/0108321 A1* | 4/2018 | Oh | G09G 3/3696 |
| 2018/0144683 A1* | 5/2018 | Shin | G09G 3/3225 |
| 2018/0158397 A1* | 6/2018 | Nam | G06F 1/3275 |
| | | | 711/E12.083 |
| 2018/0211585 A1 | 7/2018 | Huang | |
| 2019/0164470 A1 | 5/2019 | Cho et al. | |

FOREIGN PATENT DOCUMENTS

| | | |
|---|---|---|
| CN | 105957491 A | 9/2016 |
| CN | 109509442 A | 3/2019 |
| CN | 109658887 A | 4/2019 |
| CN | 109712555 A | 5/2019 |
| CN | 109830204 A | 5/2019 |
| CN | 109859684 A | 6/2019 |
| CN | 110060653 A | 7/2019 |

OTHER PUBLICATIONS

Chinese Office Action for corresponding Chinese Application No. 201910496778.9 dated Dec. 24, 2020, 11 pages.

* cited by examiner

CONTROL METHOD AND CONTROL DEVICE OF DRIVE CIRCUIT AND DRIVE CIRCUIT

CROSS REFERENCE TO RELATED APPLICATIONS

This is a U.S. National Stage application of, and claims priority to, PCT/CN2020/095419, filed Jun. 10, 2020, which further claims priority to Chinese Patent Application No. 201910496778.9, filed Jun. 10, 2019, the disclosures of which are incorporated herein by reference in their entirety.

TECHNICAL FIELD

The present disclosure relates to the field of display technology, and more particularly, to a control method and control device of a drive circuit and a drive circuit.

BACKGROUND

The statement herein merely provides background information related to the present disclosure, and does not necessarily constitute the prior art.

The liquid crystal TV has a lightweight, a thin thickness, a small power consumption, and has been widely used. In a common driving structure of a liquid crystal panel, display data is generally processed by a Timing Controller (TCON) on a Printed Circuit Board (PCB), and a Pulse-width modulation Integrated Circuit (PWM IC) provides a driving power supply, and a Gamma Integrated Circuit (Gamma IC) provides a gamma voltage for driving the liquid crystal cell.

Owning to the development of chip digitization, currently, the timing controller and the gamma chip are connected together through an Inter-Integrated Circuit (I2C) bus. It is convenient to perform a corresponding read operation on any chip through operation I2C. However, the problem that can easily occur in this connection manner is that, when the timing controller is in operation, the internal switch of the timing controller is switched on, the function circuit such as an overdrive circuit starts to operate, resulting in an increase in the operation amount of the timing controller, and further resulting in a sudden increase in the current output from the power supply chip connected to the timing controller, which causes an abnormal fluctuation in the power supply voltage. An abnormal operation of the power supply may further lead to an abnormal display.

SUMMARY

Based on the above, embodiments of the present disclosure provide a control method and control device of a drive circuit and a drive circuit.

On one hand, embodiments of the present disclosure provide a control method of a drive circuit, including:
  acquiring a bus address in a bus signal; the bus signal is a signal transmitted over an I2C bus, and the I2C bus is connected to a timing controller; and
  if determining that the bus address matches an address of the timing controller, transmitting a frequency adjustment signal to a controllable power supply with an adjustable operating frequency and connected to the timing controller; the frequency adjustment signal is configured to indicate that an operating frequency of the controllable power supply is adjusted from a first operating frequency to a second operating frequency, and the second operating frequency is higher than the first operating frequency.

In order to avoid abnormal fluctuation of the output voltage of the power supply connected to the timing controller when the timing controller operates, the control method of the drive circuit provided in the embodiment of the present application determines whether the bus address matches with the timing controller. That is, it is determined whether the timing controller is a controlled object to be operated. When it is determined that the addresses match, the frequency adjustment signal is transmitted to the controllable power supply, which makes the operating frequency of the controllable power supply increase. A higher frequency represents a shorter period, which facilitates the fluctuation caused by the operation of the timing controller to be quickly compensated, so that the overall fluctuation of the controllable power supply output voltage becomes smaller and within the normal fluctuation range, ensuring that the controllable power supply can be operated normally and the display panel can display normally.

On the other hand, embodiments of the present disclosure provide a control device of the drive circuit, including a processor and a memory storing a computer program, and the processor implements the following processing when executing the computer program:
  acquiring a bus address in a bus signal transmitted over an I2C bus; the I2C bus is connected to a timing controller;
  when it is determined that the bus address matches an address of the timing controller, transmitting a frequency adjustment signal to a controllable power supply with an adjustable operating frequency and connected to the timing controller. The frequency adjustment signal is configured to indicate that an operating frequency of the controllable power supply is adjusted from a first operating frequency to a second operating frequency, and the second operating frequency is higher than the first operating frequency.

One the other hand, embodiments of the present disclosure provide a drive circuit, including:
  a controllable power supply, the controllable power supply being a power supply with an adjustable operating frequency; and
  a timing controller including a processor, a memory, a plurality of switches and a plurality of function circuits; the memory stores switch control data for instructing to control an on or off state of each switch, an operation parameter of each function circuit, and a computer program; each function circuit is connected to the memory through a one-to-one corresponding switch; the processor is configured to be connected to an I2C bus, the processor is further connected to each of the switches, a first access terminal of the memory and the controllable power supply, the processor implements the following processing when executing the computer program:
  acquiring a bus address in a bus signal transmitted over an I2C bus; the I2C bus is connected to a timing controller;
  if determining that the bus address matches an address of the timing controller, transmitting a frequency adjustment signal to a controllable power supply and connected to the timing controller; the frequency adjustment signal is configured to indicate that an operating frequency of the controllable power supply is adjusted from a first operating frequency to a second operating frequency, and the second operating frequency is higher than the first operating frequency.

DETAILED DESCRIPTION OF THE EMBODIMENTS

For ease of understanding of the present disclosure, the present disclosure will be described more fully hereinafter with reference to the accompanying drawings. Preferred embodiments of the present disclosure are given in the accompanying drawings. However, the present disclosure may be implemented in many different forms and is not limited to the embodiments described herein. On the contrary, the purpose of providing these embodiments is to make the disclosure of the present disclosure more thorough.

It should be noted that when one element is considered to be "connected" to another element, it may be directly connected to and integrated with the other element, or there may be a centering element at the same time. As used herein, the terms "mounted", "an end, "another end" and similar expressions are for purposes of illustration only.

Unless defined otherwise, all technical and scientific terms used herein have the same meaning as commonly understood by those skilled in the art to which this disclosure pertains. The terms used herein in the description of the present disclosure are for the purpose of describing particular embodiments only and are not intended to be limiting of the present disclosure. As used herein, the term "and/or" includes any and all combinations of one or more related listed items.

Figure 1:
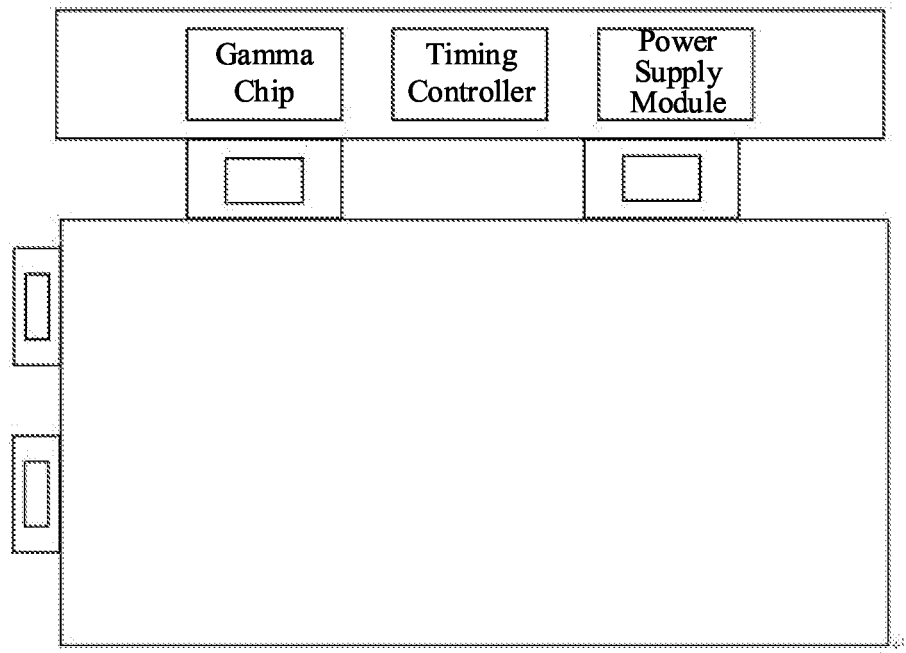
FIG. 1 is a schematic diagram of a driving architecture of a liquid crystal panel.
Figure 2:
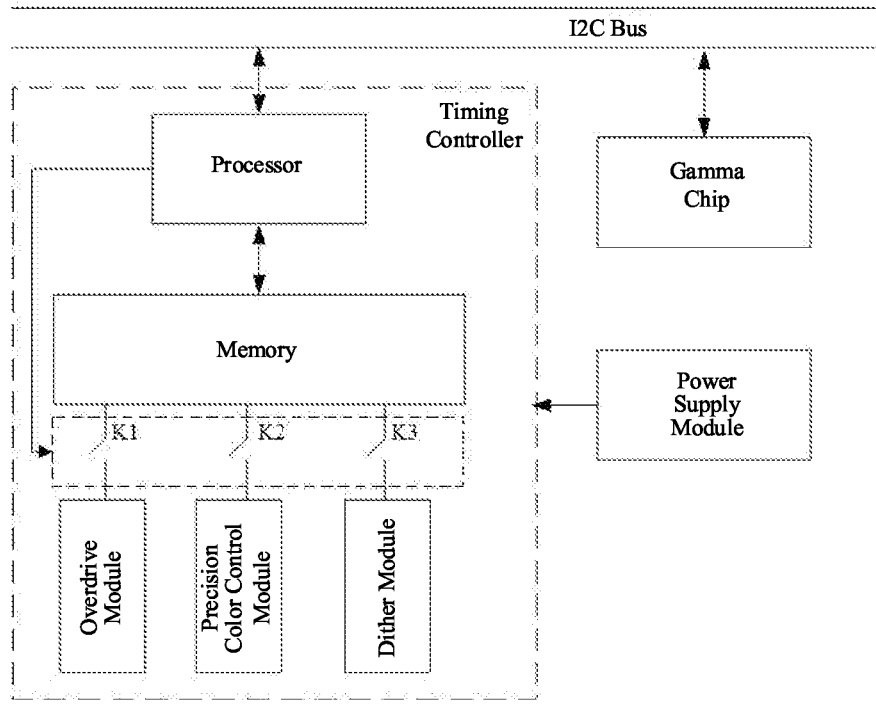
FIG. 2 is a structural schematic diagram of a drive circuit in an exemplary technology.

FIG. 1 is an exemplary driving architecture of a liquid crystal panel. The design architecture of the drive circuit in the exemplary technique is shown in FIG. 2. When there is an operation on the I2C bus (a simple, bidirectional two-wire synchronization serial bus developed by Philips, Inc.), and when the internal I2C slave (I2C bus slave device interface) detects an operation, a control signal for controlling each switch is activated, and thus all of the switches K1, K2 and K3 are simultaneously switched on, so that an Over-actuated (OD) circuit, an Advanced Color Control (ACC)/automatic chromaticity control) circuit, and a Dither circuit inside the timing controller can read the look-up table. According to such a design, the internal switch can be switched on in advance, facilitating the operation of the timing controller. However, the three circuits are turned on simultaneously, which causes the workload of processing chips inside the timing controller to increase drastically, and the current of the power supply circuit consumed will suddenly increase, which easily causes the voltage of the power supply circuit to be unstable, and causes an abnormal operation of the chips and thus causes a display abnormality.

Figure 3:
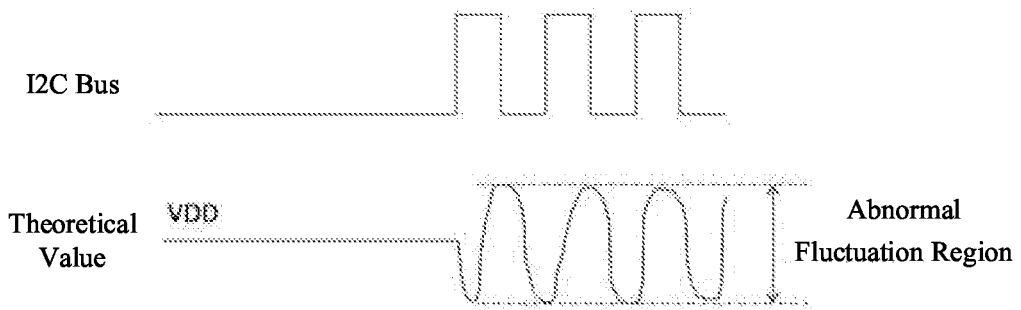
FIG. 3 is a schematic diagram of a waveform of a controllable power supply voltage in an exemplary technology.

As shown in FIG. 3, when the user transmits a signal to the gamma chip, that is, there is an operation on the I2C, the voltage VDD of the power supply circuit, which is originally stable, will enter the abnormal fluctuation region due to the sudden increase of the current.

Figure 4:
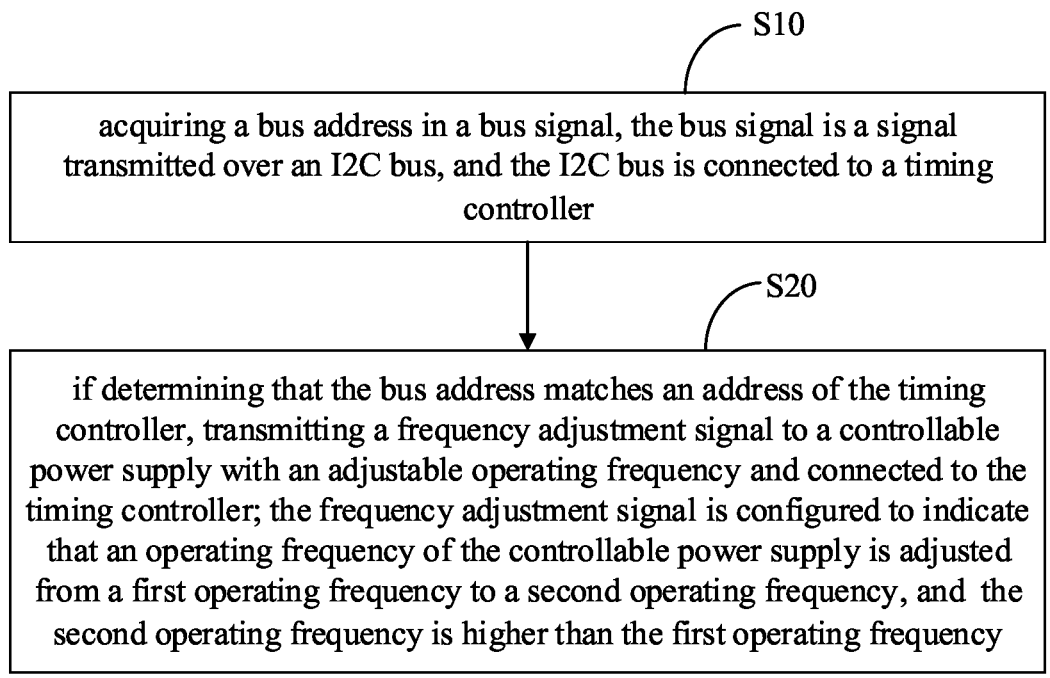
FIG. 4 is a schematic flowchart of a control method of a drive circuit according to an embodiment.

As shown in FIG. 4, an embodiment of the present disclosure provides a control method of a drive circuit, including the following.

In S10, a bus address in a bus signal is acquired; the bus signal is a signal transmitted over an I2C bus 20, and the I2C bus 20 is connected to a timing controller 10.

In S20, if determining that the bus address matches the address of the timing controller 10, a frequency adjustment signal is transmitted to the controllable power supply 30 with an adjustable operating frequency and connected to the timing controller 10; the frequency adjustment signal is configured to indicate that the operating frequency of the controllable power supply 30 is adjusted from a first operating frequency to a second operating frequency, and the second operating frequency is higher than the first operating frequency.

The I2C bus 20 is a simple, bi-directional synchronous serial bus 20 developed by Philips corporation. It requires only two wires to transmit information between the devices connected to the bus 20. Each device on the bus 20 has a unique address, and according to whether each device is used for transmitting data or receiving data, each device on the bus 20 may be divided into a master device and a slave device, and the master device is used for starting the bus 20 to transmit data, and generating a clock to start the transmission of the devices. In this case, any addressed device is considered as a slave device (for example, the timing controller 10 described above). Determining that the bus address matches the address of the timing controller 10 may be determining whether the valid bit data other than the starting bit in the 8-bit data for addressing in the signal transmitted over the bus 20 is consistent with the data corresponding to the address of the timing controller 10.

In order to avoid abnormal fluctuation of the power supply output voltage connected to the timing controller 10 during operation of the timing controller 10. The control method of the drive circuit provided by an embodiment of the present disclosure determines whether the bus address matches the timing controller 10. That is, it is determined whether the timing controller 10 is a controlled object to be operated. When it is determined that the addresses match, the frequency adjustment signal is transmitted to the controllable power supply 30, which makes the operating frequency of the controllable power supply 30 increase. A higher frequency represents a shorter period, which facilitates the fluctuations caused by the operation of the timing controller 10 to be quickly compensated, so that the overall fluctuations of the output voltage of the controllable power supply 30 become smaller and within the normal fluctuation range, thereby ensuring that the controllable power supply 30 can be operated normally and the display panel can display normally. The controllable power supply 30 may be a PWM (Pulse-Width Modulation) chip, and the PWM chip power supply has a frequency configuration bit. When it is determined that the bus address matches the address of the timing controller 10, the frequency configuration bit is controlled, so that the controllable power supply 30 operates at a higher operating frequency. For example, the PWM chip power supply may operate normally at a first operating frequency of 600 KHz or lower, and when it is determined that the bus address matches the address of the timing controller 10, the frequency configuration bit of the PWM chip power supply is controlled, so that the PWM chip power supply operates at a second operating frequency of 750 KHz or higher. Taking the controllable power supply 30 of the model ADP 2370 as an example, the FSEL pin of the ADP 2370 is at a low level when there is no external signal access, and the controllable power supply 30 operates at 600 KHz. When it is determined that the bus address matches the address of the timing controller 10, i.e. the timing controller 10 needs to be controlled to operate, a frequency adjustment signal is transmitted to the FSEL pin, and the FSEL pin is accessed a high-level signal. In this case, the operating frequency of the controllable power supply 30 is increased to 1.2 MHz for operation, which makes the voltage fluctuation of the controllable power supply 30 due to the operation of the timing controller 10 can be quickly compensated.

Figure 5:
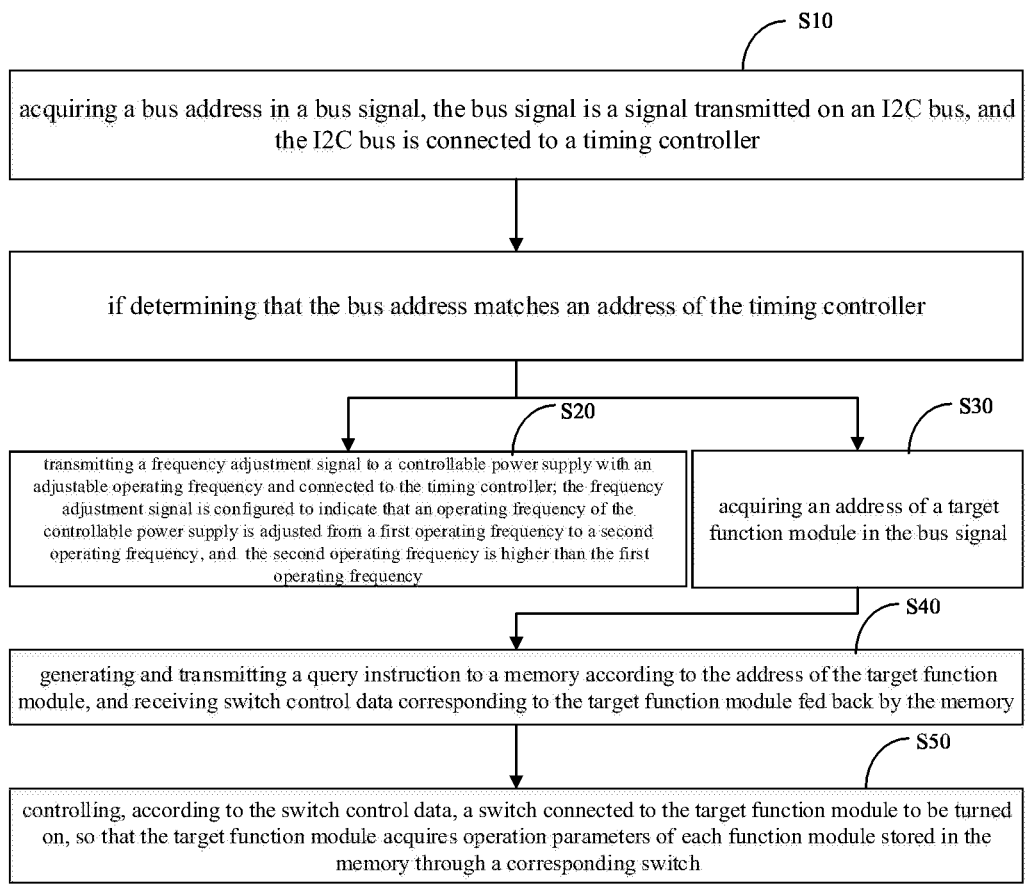
FIG. 5 is a flowchart of a control method of a drive circuit according to another embodiment.

In one embodiment, as shown in FIG. 5, the control method of the drive circuit further includes the following steps.

In S30, if determining that the bus address matches the address of the timing controller 10, the address of the target function circuit 400 in the bus signal is acquired.

In S40, a query instruction is generated and transmitted to the memory 200 according to the address of the target function circuit 400, and switch control data corresponding to the target function circuit 400 fed back by the memory 200 is received.

In S50, a switch connected to the target function circuit 400 is controlled to be turned on according to the switch control data, so that the target function circuit 400 acquires operation parameters of each function circuit 400 stored in the memory 200 through a corresponding switch.

The timing controller 10 includes a plurality of function circuits 400, and the target function circuit 400 is a controlled function circuit 400 indicated by a bus signal.

The target function circuit 400 is one or more of the function circuits 400 in the timing controller 10, and the target function circuit 400 is a target to be controlled by a bus signal that continues to be transmitted after address matching. The switch control data is data for indicating an on or off state of each switch corresponding to the address of each function circuit, and the switch control data is stored in the memory 200.

In order to avoid the fluctuation of the output voltage of the controllable power supply 30 caused by the incorrect triggering of the timing controller 10 when there is an operation on the bus 20, when it is determined that the address of the bus matches the address of the timing controller 10, that is, it indicates that the timing controller 10 is an addressed slave device, the bus signal then continues to be received. The subsequently received bus signal is parsed to acquire the address of the target function circuit 400. The parsing process may be segmented according to each byte, and then the valid bit data in the 8-bit data in each byte is converted into an address identifiable inside the timing controller 10 (for example, converting the binary into hexa-decimal, which is consistent with the system method adopted by the address storage of the function circuit 400 in the timing controller 10). Further, according to the acquired address of the target function circuit 400, a query instruction is generated and transmitted to the memory 200, and switch control data corresponding to the target function circuit 400 is acquired by accessing the memory 200. The query instruction may be an instruction including an address of the target function circuit 400, and after receiving the switch control data fed back by the memory 200, the corresponding switch is controlled to be turned on according to the data, so that the target function circuit 400 is connected to the memory 200, and the target function circuit 400 acquires its operation parameter from the memory 200 and enters the operating state.

Figure 6:
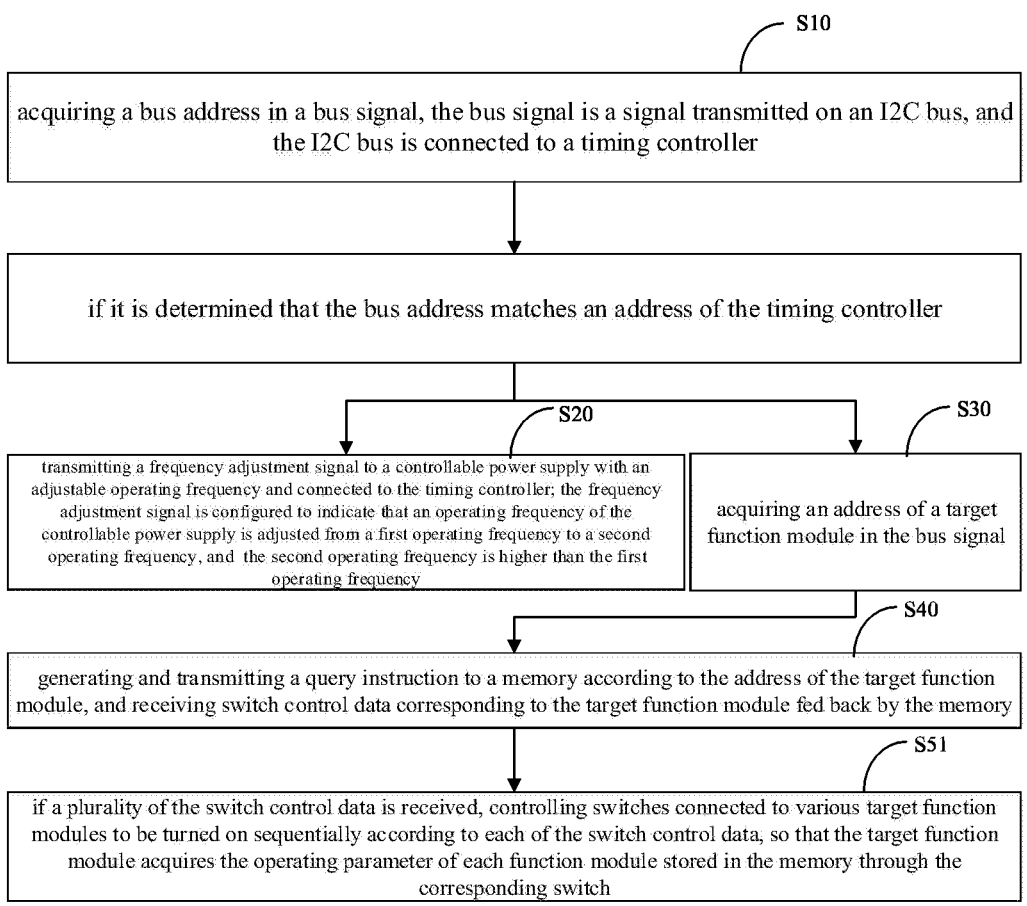
FIG. 6 is a flowchart of a control method of a drive circuit according to yet another embodiment.

In one embodiment, as shown in FIG. 6, the step of controlling, according to the switch control data, a switch connected to the target function circuit 400 to be turned on includes the following.

In S51, if a plurality of switch control data is received, the switch connected to each of the target function circuits 400 are controlled to be turned on sequentially according to each switch control data.

In order to further reduce the influence on the output voltage of the controllable power supply 30 when the timing controller 10 operates, and when the switch control data is received, that is, when a plurality of target function circuits 400 are needed to be controlled, the switches are controlled to be turned on in sequentially according to the switch control data, so as to avoid overload caused by simultaneously closing the plurality of switches, thereby avoiding overload caused by simultaneously closing the plurality of switches, and thus causing the fluctuation of the output voltage of the controllable power supply 30.

According to the control method of the drive circuit provided by the embodiment of the present disclosure, when it is detected that the bus address matches a plurality of addresses of the function circuits 400 inside the timing controller 10, a plurality of switch control analog signals are acquired from the memory 200 correspondingly. In order to further reduce the influence of the controllable power supply 30 when the plurality of function circuits 400 are simultaneously turned on, the processor 100 sequentially controls the corresponding switches to be turned on according to the switch control analog signals in a certain order, thereby ensuring that only one switch is turned on at a same time, avoiding unstable power supply voltage caused by excessive power consumption, and providing a high-quality display device and a display effect.

In one embodiment, the switch control data is stored in the look-up table in the memory 200, and the look-up table represents the corresponding relationship between the address of each function circuit 400 and the switch control data. For the convenience of querying, the switch control data is stored in the look-up table, and the look-up table is a table capable of representing the corresponding relationship between the address of each function circuit 400 and the switch control data. Specifically, the content stored in the table may be a one-to-one correspondence between the address of the function circuit 400 and the switch control data, and the query instruction may include the address of the target function circuit 400. The content stored in the table may also be a one-to-one correspondence relationship between the predefined number of the function circuit 400 and the switch control data. In this case, the process of generating the query instruction according to the address of the target function circuit 400 may be: acquiring the number of the function circuit 400 according to the address of the target function circuit 400 firstly, and then generating the query instruction including the number.

Figure 7:
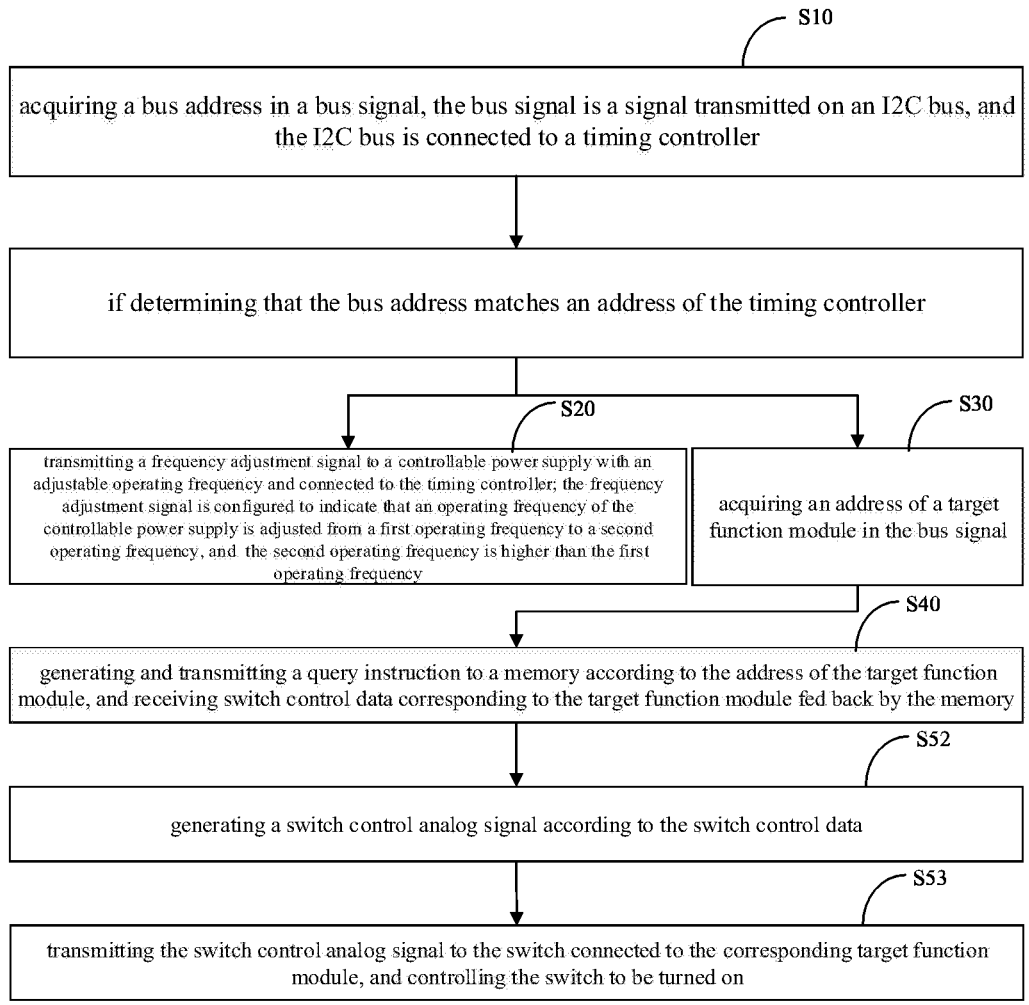
FIG. 7 is a schematic flowchart of a control method of a drive circuit according to still another embodiment.

In one embodiment, as shown in FIG. 7, the step of controlling, according to the switch control data, a switch connected to the target function circuit 400 to be turned on includes the following.

In S52, a switch control analog signal is generated according to switch control data.

In S53, a switch control analog signal transmitted to a switch connected to a corresponding target function circuit 400, and the switch is controlled to be turned on.

After receiving the switch control data fed back by the memory 200, the data is converted into a switch control analog signal capable of controlling the analog amount of the switch state, so as to control the corresponding switch to be turned on. The switch may be a MOS transistor and has a small volume. For example, the switch connected to the Dither circuit 430 may be a MOS transistor. The drain is connected to the Dither circuit 430, the source is connected to the memory 200, and the gate is used for receiving a switch control analog signal. The gate is turned on when a high-level switch control analog signal is received, and the Dither circuit 430 acquires a corresponding operation parameter from the memory 200, and starts operating. It should be noted that, the switch may also be other types of electronic switches, such as transistors, and the connection mode adaptively adjusts with the switch type to ensure that the switch can be turned on after receiving the corresponding switch control analog signal.

In one embodiment, the operation parameters of the function circuits 400 include an operation parameter of the overdrive circuit 410, an operation parameter of the precision color control circuit 420, and an operation parameters of the Dither circuit 430, and the switch control analog signal includes:
  a first control signal C1, configured to control the first switch K1 connected to the overdrive circuit 410 to be turned on, so that the overdrive circuit 410 acquires the operation parameter of the overdrive circuit 410 from the memory 200.
  a second control signal C2, configured to control the second switch K2 connected to the precision color control circuit 420 to be turned on, so that the precision color control circuit 420 acquires the operation parameter of the precision color control circuit 420 from the memory 200 through the second switch K2.
  a third control signal C3, configured to control the third switch K3 connected to the Dither circuit 430 to be turned on, so that the Dither circuit 430 acquires the operation parameter of the Dither circuit 430 from the memory 200 through the third switch K3.

The function circuits 400 include the overdrive circuit 410, the precision color control circuit 420 and the Dither circuit 430, and the switch 300 includes a first switch K1, a second switch K2 and a third switch K3.

The overdrive circuit 410 is configured to modulate a data signal received by the timing controller 10, and the data signal is a signal for driving the display panel. The data signal modulated by the overdrive circuit 410 can overdrive the liquid crystal to improve the response speed of the liquid crystal molecules. The precision color control circuit 420 is a closed-loop negative feedback amplification circuit, and is configured to control the amplitude of the chroma signal. The precision color control circuit 420 detects the chroma synchronization signal as a standard, controls the amplitude of the chroma signal according to the size of the chroma synchronization signal, and automatically changes the gain, so that the chrominance signal reaches a stable value. The Dither circuit 430 may perform a random dither operation, which may improve the image reality of the digital display.

In one specific embodiment, for the three common function circuits 400 in the timing controller 10, the switch control analog signal includes a first control signal C1, a second control signal C2 and a third control signal C3 that respectively control the first switch K1, the second switch K2 and the third switch K3. The first switch K1 is a switch connected to the overdrive circuit 410, the second switch K2 is a switch connected to the precision color control circuit 420, and the third switch K3 is a switch connected to the Dither circuit 430. If it is determined that the bus address matches the address of the timing controller 10, the data information is further received, and the data information is parsed to acquire the address of the target function circuit 400. If the address is an address of the overdrive circuit 410, switch control data corresponding to the address is acquired from the memory 200, the first control signal C1 is generated according to the data. The first control signal C1 is transmitted to the first switch K1, and the first switch K1 is driven to be turned on. The overdrive circuit 410 acquires its operation data from the memory 200, and starts operation. By the same reasoning, if the target to be controlled is the precision color control circuit 420 and the Dither circuit 430, the implementation process is the same with the overdrive circuit 410. If it is necessary to control the three function circuits 400 to operate, that is, the addresses of the three target function circuits 400 are generated according to the data information, then, the memory 200 is queried to acquire three switch control data and the first control signal C1, the second control signal C2 and the third control signal C3 are generated according to the three switch control analog signals. The first control signal C1, the second control signal C2 and the third control signal C3 are transmitted to the corresponding first switch K1, the second switch K2 and the third switch K3 sequentially. Only one switch is turned on at the same time. The order of operating the switches sequentially may be in other order other than the order described in the above example.

In one embodiment, the query instruction includes the address of the target function circuit 400. The query instruction may include the address of the target function circuit 400, and after receiving the query instruction, the memory 200 may acquire switch control data corresponding to the address of which function circuit 400 to be queried by the query instruction, and provide a basis for the look-up table.

Figure 8:
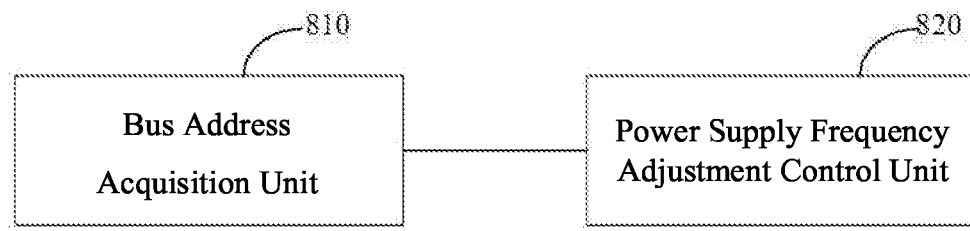
FIG. 8 is a schematic structural diagram of a control device of the drive circuit according to an embodiment.

On the other hand, as shown in FIG. 8, an embodiment of the present disclosure further provides a control device of the drive circuit, including:
  a bus address acquisition unit 810, configured to acquire the bus address in the bus signal transmitted over the I2C bus 20, and the I2C bus 20 is connected to the timing controller 10;
  a power supply frequency adjustment control unit 820, configured to, when it is determined that the address of the bus matches the address of the timing controller 10, transmit a frequency adjustment signal to the controllable power supply 30 with an adjustable operating frequency and connected to the timing controller 10. The frequency adjustment signal is configured to indicate that the operating frequency of the controllable power supply 30 is adjusted from a first operating frequency to a second operating frequency, and the second operating frequency is higher than the first operating frequency.

The controllable power supply 30, the switch 300, and the like have the same meaning and optional disclosure as those in the control method of the drive circuit, and will not be described herein.

Figure 9:
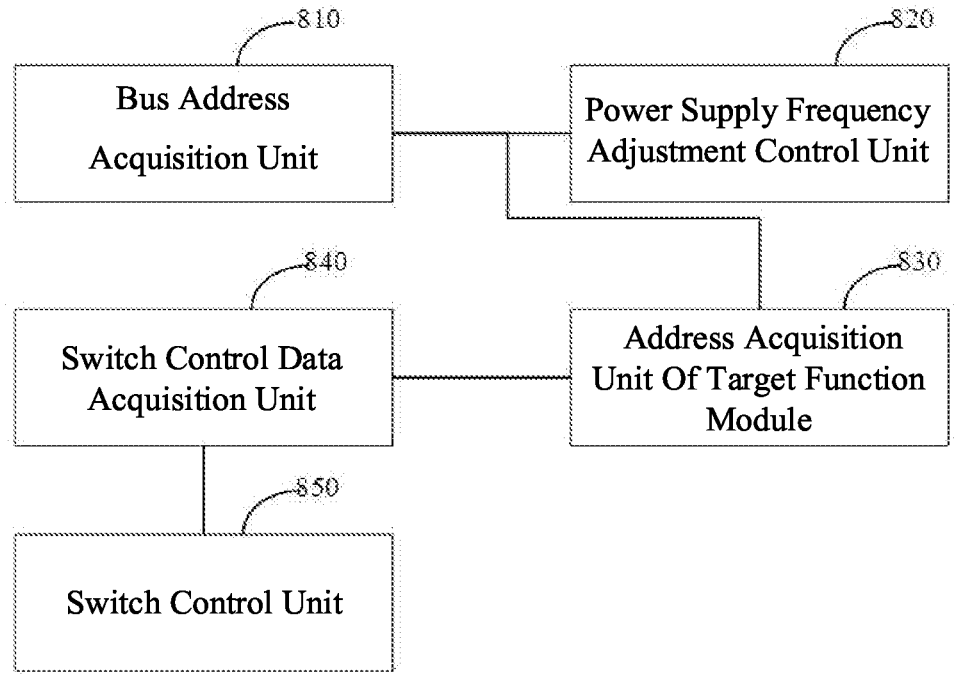
FIG. 9 is a schematic structural diagram of a control device of the drive circuit according to still another embodiment.

In one embodiment, as shown in FIG. 9, the control device of the drive circuit further includes:

an address acquisition unit 830 of the target function circuit 400, configured to acquire the address of the target function circuit 400 in the bus signal when it is determined that the address of the bus matches the address of the timing controller 10;

a switch control data acquisition unit 840, configured to generate and transmit a query instruction to the memory 200 according to the address of the target function circuit 400, and receive switch control data corresponding to the target function circuit 400 fed back by the memory 200;

a switch control unit 850, configured to control the switch 300 connected to the target function circuit 400 to be turned on according to the switch control data, so that the target function circuit 400 acquires the operation parameters of the function circuits 400 stored in the memory 200 through the corresponding switch.

The timing controller 10 includes a plurality of function circuits 400, and the target function circuit 400 is a controlled function circuit 400 indicated by a bus signal.

The definition of the address of the target function circuit 400 is the same as that in the control method of the drive circuit, and is not repeated here.

A computer readable storage medium having stored thereon a computer program is provided. The computer program is executed by a processor to implement the following processing:

acquiring a bus address in a bus signal, the bus signal being a signal transmitted over an I2C bus 20, and the I2C bus 20 being connected to a timing controller 10;

If determining that the bus address matches the address of the timing controller 10, transmitting a frequency adjustment signal to the controllable power supply 30 with an adjustable operating frequency and connected to the timing controller 10, and the frequency adjustment signal is configured to indicate that the operating frequency of the controllable power supply 30 is adjusted from a first operating frequency to a second operating frequency, and the second operating frequency is higher than the first operating frequency.

When the computer program stored in the computer readable storage medium provided in the embodiments of the present disclosure is executed by the processor, other steps in the foregoing method embodiments may also be implemented.

A person of ordinary skill in the art may understand that all or part of the processes of the method in the foregoing embodiments may be implemented by a computer program instructing relevant hardware. The computer program may be stored in a non-transitory computer readable storage medium. When the computer program is executed, the processes of the foregoing method embodiments may be implemented. Any reference to memory, storage, database or other media used in the embodiments provided by the present disclosure may include non-transitory and/or transitory memory. The non-transitory memory may include read-only memory (ROM), programmable ROM (PROM), electrically programmable ROM (EPROM), electrically erasable programmable ROM (EEPROM), or flash memory. The volatile memory may include a random access memory (RAM) or an external cache. By way of illustration and not limitation, RAM is available in a variety of forms, such as static RAM (SRAM), dynamic RAM (DRAM), synchronous DRAM (SDRAM), dual data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

Figure 10:
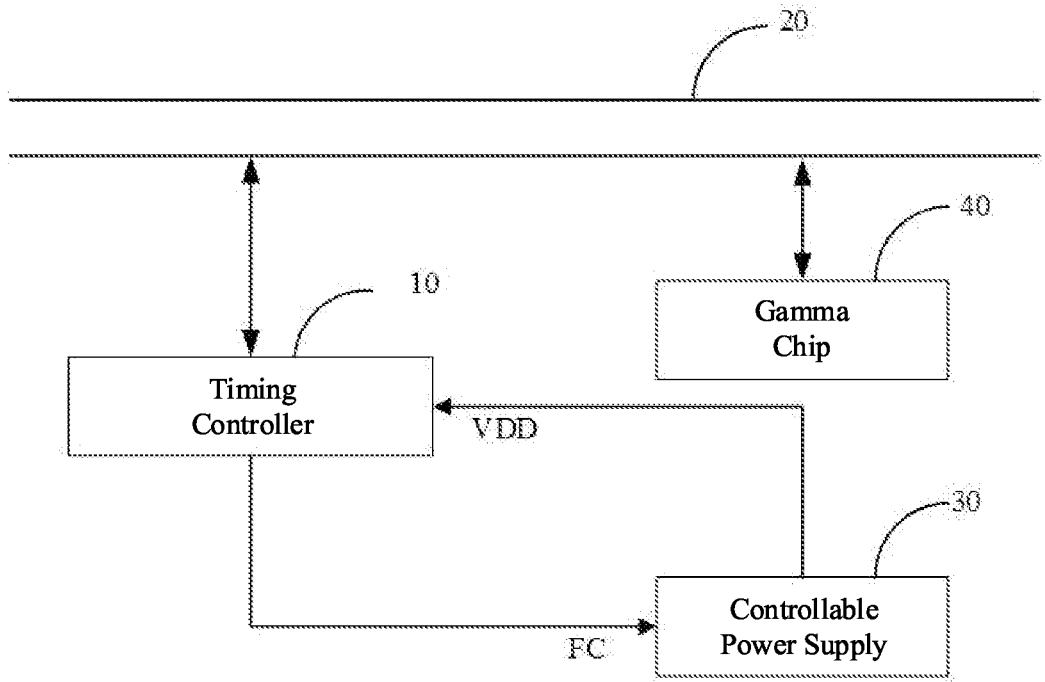
FIG. 10 is a structural schematic diagram of a drive circuit according to an embodiment.

As shown in FIG. 10, an embodiment of the present disclosure provides a drive circuit, including:

a controllable power supply 30, the controllable power supply 30 being a power supply with an adjustable operating frequency;

a timing controller 10, configured to be connected to the I2C bus 20 and the controllable power supply 30. The timing controller 10 is configured to acquire a bus address in a bus signal transmitted over the I2C bus 20. When it is determined that the bus address matches the address of the timing controller 10, a frequency adjustment signal is transmitted to the controllable power supply 30, and the frequency adjustment signal is configured to indicate that the operating frequency of the controllable power supply 30 is adjusted from a first operating frequency to a second operating frequency; the second operating frequency is higher than the first operating frequency.

The function circuit 400, the switch 300, and the like have the same meaning as those in the above control method of the drive circuit, and will not be described herein. According to the drive circuit provided by the embodiment of the present disclosure, the timing controller 10 is connected to the controllable power supply 30. The timing controller 10 determines whether the bus address matches its own address firstly. If the addresses match, the frequency adjustment signal is transmitted to the controllable power supply 30. The operating frequency of the controllable power supply 30 is increased. The fluctuation of the power supply voltage caused by the operation of the timing controller 10 is quickly compensated. The power supply voltage is in a normal fluctuation range.

In one embodiment, when the timing controller determines that the bus address matches its own address, the timing controller 10 continues to receive the bus signal, parse the bus signal, and acquire the address of the target function circuit 400, and further control the corresponding switch 300 to be turned on according to the address of the target function circuit 400, so that the target function circuit 400 starts to operate.

Figure 11:
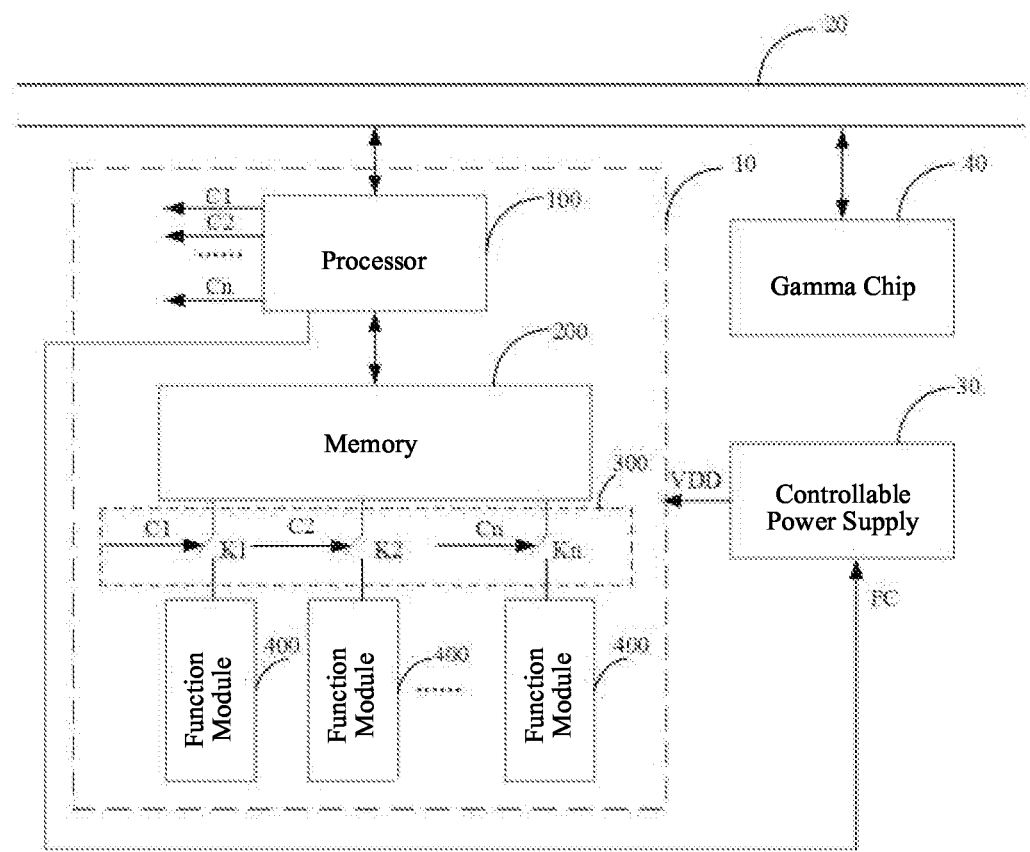
FIG. 11 is a structural schematic diagram of a drive circuit according to yet another embodiment.

An embodiment of the present disclosure provides a drive circuit, as shown in FIG. 11, including:

a controllable power supply 30, the controllable power supply 30 being a power supply with an adjustable operating frequency;

a timing controller 10 including a processor 100, a memory 200, a plurality of switches and a plurality of function circuits 400; The memory 200 stores switch control data for instructing to control an on or off state of each switch, an operation parameter of each function circuit 400, and a computer program. Each function circuit 400 is connected to the memory 200 through a one-to-one corresponding switch. The processor 100 is configured to be connected the I2C bus 20, and the processor 100 is further connected to each of the switches, a first access terminal of the memory 200 and a controllable power supply 30. The processor 100 implements the following processing when executing a computer program. a timing controller 10 including a processor 100, a memory 200, a plurality of switches and a plurality of function circuits 400; The memory 200 stores switch control data for instructing to control an on or off state of each switch, an operation parameter of each function circuit 400, and a computer program. Each function circuit 400 is connected to the memory 200 through a one-to-one corresponding switch. The processor 100 is configured to be connected the I2C bus 20, and the processor 100 is further connected to each of the switches, a first access terminal of the memory 200 and a controllable power supply 30. The processor 100 implements the following processing when executing a computer program.

In S10, a bus address in a bus signal transmitted over the I2C bus 20 is acquired, and the I2C bus 20 is connected to the timing controller 10.

S20: if determining that the bus address matches the address of the timing controller 10, a frequency adjustment signal is transmitted to the controllable power supply 30 connected to the timing controller 10. The frequency adjustment signal is configured to indicate that the operating frequency of the controllable power supply 30 is adjusted from the first operating frequency to the second operating frequency, and the second operating frequency is higher than the first operating frequency.

In one embodiment, when the processor 100 executes a computer program, the following processing can also be implemented.

In S30, if determining that the bus address matches the address of the timing controller 10, the address of the target function circuit 400 in the bus signal is acquired.

In S40, a query instruction is generated and transmitted to the memory 200 according to the address of the target function circuit 400, and receiving switch control data corresponding to the target function circuit 400 fed back by the memory 200.

In S50, the switch connected to the target function circuit 400 is controlled to be turned on according to the switch control data, so that the target function circuit 400 acquires the operation parameters of each function circuit 400 stored in the memory 200 through a corresponding switch.

The timing controller 10 includes a plurality of function circuits 400, and the target function circuit 400 is a controlled function circuit 400 indicated by a bus signal.

Figure 12:
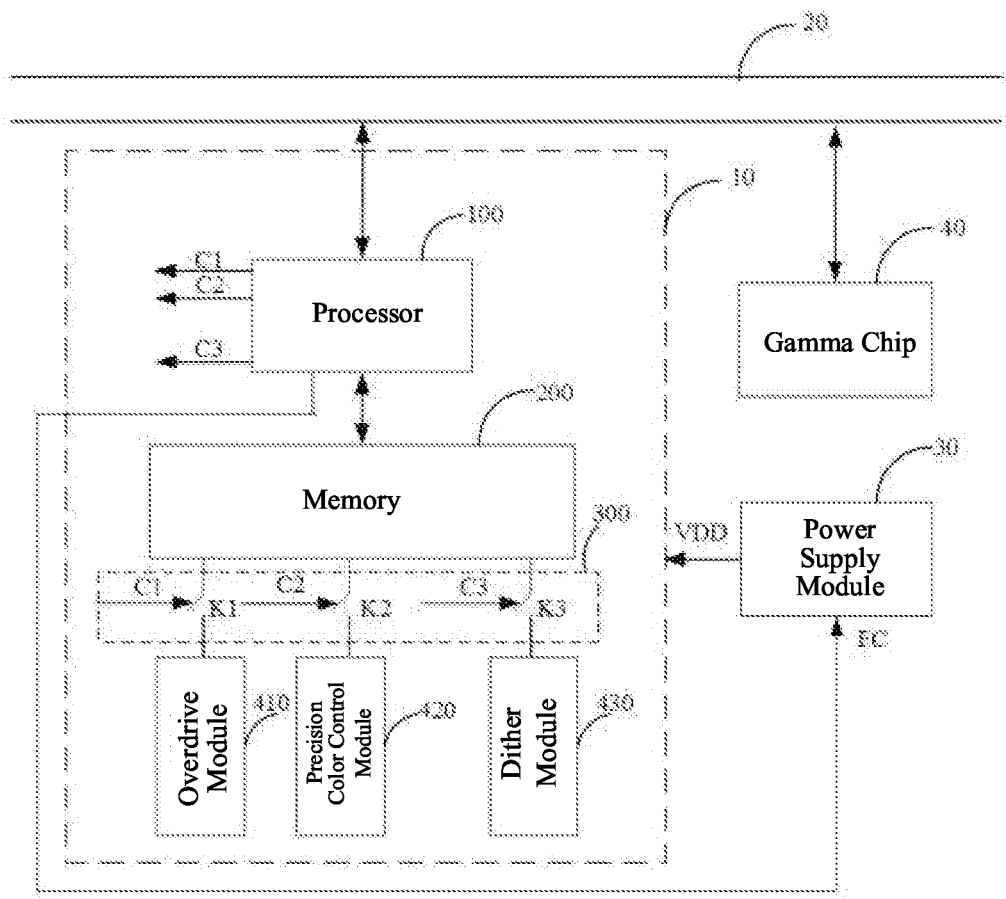
FIG. 12 is a schematic structural diagram of a drive circuit according to still another embodiment.

In one embodiment, as shown in FIG. 12, the parameters of the function circuits 400 include the operation parameter of the overdrive circuit 410, the operation parameter of the precision color control circuit 420, and the operation parameter of the Dither circuit 430. The switch control analog signal includes a first control signal C1, a second control signal C2, and a third control signal C3, and the switch includes:

a first switch K1, a first end of which is connected to a second access terminal of the memory 200;
a second switch K2, a first end of which is connected to a second access terminal of the memory 200;
a third switch K3, a first end of which is connected to a second access terminal of the memory 200;
The function circuit 400 includes:
an overdrive circuit 410, an input end of the overdrive circuit 410 being connected to a second end of the first switch K1;
a precision color control circuit 420, an input end of the precision color control circuit 420 being connected to a second end of the second switch K2;
a Dither circuit 430, an input end of the Dither circuit 430 being connected to a second end of the third switch K3.

The processor 100 is configured to control the first switch K1 to be turned on according to the first control signal C1, and configured to control the second switch K2 to be turned on according to the second control signal C2, and further configured to control the third switch K3 to be turned on according to the third control signal C3.

The first switch K1, the second control signal C2 and the like have the same interpretations as those in the foregoing method embodiments, and are not described again herein. The switching states of the switches can be individually controlled by means of one-to-one correspondence between the respective control signals and the respective switches. When it is required to control a plurality of function circuits, the respective function circuits can be controlled sequentially, and one switch can be turned on at a same time, thereby avoiding fluctuation of the output voltage of the power supply circuit 40 caused by the operation of the timing controller and improving the display quality.

In one embodiment, as shown in FIG. 11, the drive circuit further includes a gamma chip 40, and the gamma chip 40 is configured to be connected to the I2C bus 20. Specifically, the gamma chip 40 and the timing controller 10 are both connected to the I2C bus 20, and the controllable power supply 30 supplies power to the timing controller 10. In order to avoid the malfunction of the timing controller 10 when the gamma chip 40 is operated, and all the function circuits 400 in the timing controller 10 are turned on, thereby causing fluctuation of the output voltage of the controllable power supply 30, the timing controller 10 in the above embodiment is adopted. Whether the bus address matches the address of the timing controller 10 is firstly determined. If the addresses match, the next operation is performed, and the address of the target function circuit 400 is further acquired. The switch control data corresponding to the target function circuit 400 is acquired from the memory 200. The corresponding switch is controlled to be turned on according to the data, and the target function circuit 400 acquires the operation parameter from the memory 200 to start operation.

Figure 13:
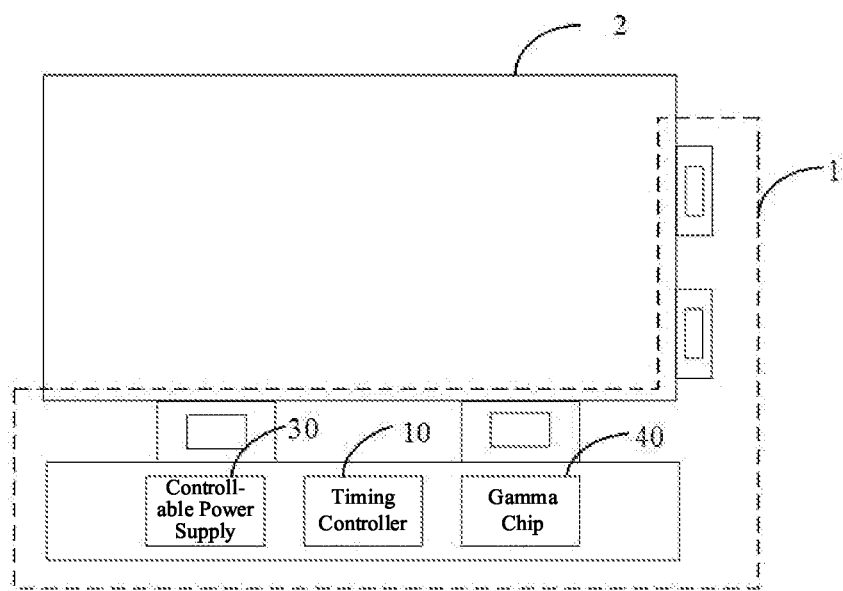
FIG. 13 is a structural schematic diagram of a display device according to an embodiment.

A display device, as shown in FIG. 13, including a display panel 2 and the above-described drive circuit 1. The drive circuit 1 is configured to drive the display panel 2 to display.

The display device provided by the embodiment of the present disclosure has the above-described drive circuit 1, which can ensure that the output voltage of the controllable power supply 30 is stabilized when there is an operation on the bus, and the fluctuation of the output voltage of the controllable power supply 30 can be quickly compensated, and the overall voltage is within a normal fluctuation range, thereby ensuring stable operation of each device and stable display effect.

The technical features of the described embodiments can be combined arbitrarily, and in order to briefly describe the description, all possible combinations of the technical features in the described embodiments are not described; however, as long as the combination of these technical features does not have any contradiction, it should be considered to be the scope of disclosure disclosed in the present description.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the concept of the present disclosure, which all belong to the scope of protection of the present disclo-

What is claimed is:

1. A control method of a drive circuit, comprising:
acquiring a bus address in a bus signal, wherein the bus signal is a signal transmitted over an I2C bus, and the I2C bus is connected to a timing controller;
determining that the bus address matches an address of the timing controller; and
transmitting a frequency adjustment signal to a controllable power supply with an adjustable operating frequency and connected to the timing controller, wherein the frequency adjustment signal is configured to indicate that an operating frequency of the controllable power supply is adjusted from a first operating frequency to a second operating frequency, and wherein the second operating frequency is higher than the first operating frequency;
wherein the timing controller comprises a plurality of function circuits, and the method further comprises:
determining that the bus address matches the address of the timing controller;
acquiring an address of a target function circuit in the bus signal;
generating and transmitting a query instruction to a memory according to the address of the target function circuit, and receiving switch control data corresponding to the target function circuit fed back by the memory; and
controlling, according to the switch control data, a switch connected to the target function circuit to be turned on, so that the target function circuit acquires operation parameters of each function circuit stored in the memory through a corresponding switch; and
wherein the target function circuit is a controlled function circuit indicated by the bus signal.

2. The control method of the drive circuit according to claim 1, wherein the transmitting a frequency adjustment signal to a controllable power supply with an adjustable operating frequency and connected to the timing controller comprises:
transmitting the frequency adjustment signal to a frequency configuration bit of the controllable power supply, and adjusting the frequency configuration bit, so that the controllable power supply operates at the second operating frequency.

3. The control method of the drive circuit according to claim 1, wherein the first operating frequency is 600 KHz or lower, and the second operating frequency is 750 KHz or higher.

4. The control method of the drive circuit according to claim 1, wherein the first operating frequency is 600 KHz, and the second operating frequency is 1.2 MHz.

5. The control method of the drive circuit according to claim 1, wherein acquiring an address of the target function circuit in a bus signal comprises:
continuing to receive the bus signal and parsing the subsequently received bus signal to convert the bus signal to an address identifiable inside the timing controller.

6. The control method of the drive circuit according to claim 1, wherein controlling, according to the switch control data, a switch connected to the target function circuit to be turned on comprises:
receiving a plurality of the switch control data, and controlling the switch connected to each of the target function circuits to be turned on sequentially according to each of the switch control data.

7. The control method of the drive circuit according to claim 1, wherein the timing controller determining that the bus address matches an address of the timing controller comprises:
determining whether valid bit data other than a starting bit in data in the signal transmitted over the bus for addressing is consistent with data corresponding to the address of the timing controller.

8. The control method of the drive circuit according to claim 1, wherein the switch control data is stored in a look-up table in the memory, and the look-up table represents a corresponding relationship between an address of each function circuit and switch control data.

9. The control method of the drive circuit according to claim 1, wherein controlling, according to the switch control data, a switch connected to the target function circuit to be turned on comprises:
generating a switch control analog signal according to the switch control data;
transmitting the switch control analog signal to the switch connected to the corresponding target function circuit, and controlling the switch to be turned on.

10. The control method of the drive circuit according to claim 9, wherein the operation parameters of the function circuits comprise an operation parameter of an overdrive circuit, an operation parameter of a precision color control circuit and an operation parameter of a Dither circuit, and the switch control analog signal comprises:
a first control signal, configured to control a first switch connected to the overdrive circuit to be turned on, so that the overdrive circuit acquires the operation parameter of the overdrive circuit from the memory;
a second control signal, configured to control a second switch connected to the precision color control circuit to be turned on, so that the precision color control circuit acquires the operation parameter of the precision color control circuit from the memory through the second switch; and
a third control signal, configured to control a third switch connected to the Dither circuit to be turned on, so that the Dither circuit acquires the operation parameter of the Dither circuit from the memory through the third switch;
wherein the function circuits comprise the overdrive circuit, the precision color control circuit and the Dither circuit, and the switches comprise the first switch, the second switch and the third switch.

11. The control method of the drive circuit according to claim 1, wherein the controllable power supply is a pulse width modulation chip power supply.

12. A control device of a drive circuit, comprising a processor and a memory storing a computer program, wherein the processor implements the following processing when executing the computer program:
acquiring a bus address in a bus signal transmitted over an I2C bus, wherein the I2C bus is connected to a timing controller;
determining that the bus address matches an address of the timing controller; and
transmitting a frequency adjustment signal to a controllable power supply with an adjustable operating frequency and connected to the timing controller, wherein the frequency adjustment signal is configured to indicate that an operating frequency of the controllable power supply is adjusted from a first operating frequency to a second operating frequency, and wherein the second operating frequency is higher than the first operating frequency;

wherein the timing controller comprises a plurality of function circuits, and the processor further implements the following processing:

determining that the bus address matches the address of the timing controller;

acquiring an address of a target function circuit in the bus signal;

generating and transmitting a query instruction to a memory according to the address of the target function circuit, and receiving switch control data corresponding to the target function circuit fed back by the memory; and controlling, according to the switch control data, a switch connected to the target function circuit to be turned on, so that the target function circuit acquires operation parameters of each function circuit stored in the memory through a corresponding switch; and wherein the target function circuit is a controlled function circuit indicated by the bus signal.

13. A drive circuit, comprising:

a controllable power supply, the controllable power supply being a power supply with an adjustable operating frequency; and a timing controller comprising a processor, a memory, a plurality of switches and a plurality of function circuits; wherein the memory stores switch control data for instructing to control an on or off state of each switch, an operation parameter of each function circuit, and a computer program; each function circuit is connected to the memory through a one-to-one corresponding switch; the processor is configured to be connected to an I2C bus, the processor is further connected to each of the switches, a first access terminal of the memory and the controllable power supply; and the processor implements the following processing when executing the computer program:

acquiring a bus address in a bus signal transmitted over an I2C bus, wherein the I2C bus is connected to a timing controller;

if the timing controller determining that the bus address matches an address of the timing controller; and transmitting a frequency adjustment signal to a controllable power supply and connected to the timing controller, wherein the frequency adjustment signal is configured to indicate that an operating frequency of the controllable power supply is adjusted from a first operating frequency to a second operating frequency, and wherein the second operating frequency is higher than the first operating frequency.

14. The drive circuit according to claim 13, wherein the processor further implements the following processing when executing the computer program:

transmitting the frequency adjustment signal to a frequency configuration bit of the controllable power supply, and adjusting the frequency configuration bit, so that the controllable power supply operates at the second operating frequency.

15. The drive circuit according to claim 13, wherein the first operating frequency is 600 KHz or lower, and the second operating frequency is 750 KHz or higher.

16. The drive circuit according to claim 13, wherein the first operating frequency is 600 KHz, and the second operating frequency is 1.2 MHz.

17. The drive circuit according to claim 13, wherein the processor further implements the following processing when executing the computer program:

determining that the bus address matches the address of the timing controller, acquiring an address of a target function circuit in the bus signal;

generating and transmitting a query instruction to the memory according to an address of the target function circuit, and receiving switch control data corresponding to the target function circuit fed back by the memory; and controlling, according to the switch control data, a switch connected to the target function circuit to be turned on, so that the target function circuit acquires operation parameters of each function circuit stored in the memory through a corresponding switch; and wherein the target function circuit is a controlled function circuit indicated by the bus signal.

18. The drive circuit according to claim 13, further comprising a gamma chip, wherein the gamma chip is configured to be connected to the I2C bus.

19. The drive circuit according to claim 13, wherein the controllable power supply is a pulse width modulation chip power supply.

* * * * *